(12) United States Patent
Jeong

(10) Patent No.: US 12,107,777 B2
(45) Date of Patent: *Oct. 1, 2024

(54) METHOD FOR TRANSMITTING DOWNLINK PACKET IN FUNCTION-SEPARATED CORE NETWORK

(71) Applicant: SK TELECOM CO., LTD., Seoul (KR)

(72) Inventor: Sangsoo Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,321

(22) Filed: Apr. 3, 2020

(65) Prior Publication Data

US 2020/0236067 A1 Jul. 23, 2020

Related U.S. Application Data

(63) Continuation of application No. 16/044,906, filed on Jul. 25, 2018, now Pat. No. 10,659,397, which is a (Continued)

(30) Foreign Application Priority Data

Jan. 25, 2016 (KR) ........................ 10-2016-0008674

(51) Int. Cl.
*H04W 28/14* (2009.01)
*H04L 49/90* (2022.01)
(Continued)

(52) U.S. Cl.
CPC ......... *H04L 49/90* (2013.01); *H04W 28/0278* (2013.01); *H04W 28/14* (2013.01);
(Continued)

(58) Field of Classification Search
CPC ..... H04W 88/16; H04W 88/02; H04W 88/08; H04W 28/14; H04W 40/34; H04W 28/0278; H04W 72/085; H04L 49/90
See application file for complete search history.

(56) References Cited

U.S. PATENT DOCUMENTS 10,420,029 B2 * 9/2019 Ryu ....................... H04W 76/10
2011/0310804 A1 12/2011 Beygzadeh
(Continued)

FOREIGN PATENT DOCUMENTS

CN 103477665 A 12/2013
WO 2015000516 A1 1/2015

OTHER PUBLICATIONS

International Search Report issued Feb. 16, 2017, corresponding to International Application No. PCT/KR2016/013330 citing the above reference(s).

(Continued)

*Primary Examiner* — Khaled M Kassim
*Assistant Examiner* — Hector Reyes
(74) *Attorney, Agent, or Firm* — Hauptman Ham, LLP

(57) ABSTRACT

The present invention discloses method for transmitting downlink packet in function-separated core network.
It is an object of the embodiments of the present disclosure to provide a method for transmitting a downlink packet for a UE in an idle mode which is capable of reducing a data transmission latency for a user and efficiently using network resources in a mobile communication system in which the control plane and the user plane of a gateway node are separated.

12 Claims, 7 Drawing Sheets

Related U.S. Application Data continuation of application No. PCT/KR2016/013330, filed on Nov. 18, 2016.

(51) Int. Cl.

| | | |
|---|---|---|
| *H04W 28/02* | (2009.01) | |
| *H04W 40/34* | (2009.01) | |
| *H04W 72/542* | (2023.01) | |
| *H04W 88/16* | (2009.01) | |
| *H04W 88/02* | (2009.01) | |
| *H04W 88/08* | (2009.01) | |

(52) U.S. Cl.
CPC ......... *H04W 40/34* (2013.01); *H04W 72/542* (2023.01); *H04W 88/16* (2013.01); *H04W 88/02* (2013.01); *H04W 88/08* (2013.01)

(56) References Cited

U.S. PATENT DOCUMENTS

| | | |
|---|---|---|
| 2012/0157132 A1 | 6/2012 | Olsson et al. |
| 2013/0064158 A1 | 3/2013 | Sundell et al. |
| 2015/0023176 A1 | 1/2015 | Korja et al. |
| 2015/0264739 A1 | 9/2015 | Hurtta |
| 2015/0359018 A1 | 12/2015 | Li et al. |
| 2016/0021639 A1* | 1/2016 | Ma .................... H04W 52/0216 455/458 |
| 2016/0128078 A1 | 5/2016 | Murthy et al. |
| 2016/0142977 A1 | 5/2016 | Hoffmann |
| 2017/0086111 A1* | 3/2017 | Vrzic ................. H04W 36/023 |
| 2017/0208634 A1* | 7/2017 | Bharatia ............... H04W 76/11 |
| 2018/0092142 A1* | 3/2018 | Han ...................... H04W 16/14 |
| 2018/0192456 A1* | 7/2018 | Li ........................ H04W 76/14 |
| 2018/0302857 A1* | 10/2018 | Shan .................... H04W 68/005 |
| 2018/0317199 A1* | 11/2018 | Cao ........................ H04W 68/04 |
| 2020/0396712 A1* | 12/2020 | Cao ........................ H04W 24/10 |

OTHER PUBLICATIONS

Japanese Office Action for corresponding Japanese application No. 2018-558099 dated Jun. 11, 2019, citing the above references.

Extended European Search Report for corresponding the copending PCT application No. PCT/KR2016013330 dated Jun. 18, 2019, citing the above references.

Ericsson, "Fountional split", SA WG2 Meeting #112, Nov. 16-20, 2015, Anaheim, CA, USA, cited in NPL No. 2.

Alcatel-Lucent, "Location of the resource allocation functions (F-TEID)", SA WG2 Meeting #113, Jan. 25-29, 2016, Saint Kitts, KN, cited in NPL No. 2.

3rd Generation Partnership Project, Technical Specification Group Services and System Aspects, Study on optimizations to support high latency communications, Stage 2 (Release 13), 3GPP TR 23.709 V13. 0.0, Jun. 21, 2015, cited in NPL No. 2.

Alcatel-Lucent, "Updated of solution 6", SA WG2 Meeting #110ah, Aug. 31-Sep. 3, 2015, Sophia Antipolis, France, cited in NPL No. 3.

Chinese Office Action issued on Nov. 25, 2020, in connection with the Chinese Patent Application No. 201680079838.1 citing the above reference(s).

Chinese Office Action issued on Oct. 25, 2023, in connection with the Chinese Patent Application No. 202110884356.6 with its English translation (15 pages).

Chinese Office Action issued on Oct. 26, 2023, in connection with the Chinese Patent Application No. 202110884353.2 with its English translation (16 pages).

European Office Action dated May 30, 2023 for corresponding European Patent Application No. 21151472.4, 6 pages.

\* cited by examiner

METHOD FOR TRANSMITTING DOWNLINK PACKET IN FUNCTION-SEPARATED CORE NETWORK

CROSS-REFERENCE TO RELATED APPLICATION

This application is a continuation of U.S. application Ser. No. 16/044,906, filed Jul. 25, 2018, which is a continuation of International Application PCT/KR2016/013330 filed Nov. 18, 2016 which claims priority under 35 U.S.C. § 111(a) of Patent Application No. 10-2016-0008674, filed on Jan. 25, 2016 in Korea, the entire contents of which are incorporated herein by reference.

TECHNICAL FIELD

The present disclosure relates to a method for transmitting a downlink packet to a user equipment in an idle mode in a mobile communication system in which a control plane and a user plane of a gateway node are separated.

BACKGROUND

The statements in this section merely provide background information on the present disclosure and do not necessarily constitute the prior art.

As demand for multimedia services increases, discussions about 5th generation mobile communication technology supporting massive traffic are underway. In the 5G mobile communication system, it is an important task to efficiently process massive traffic. To address this issue, a discussion on separating the functions of the control plane (CP) and the user plane (UP) of the gateway from each other is underway in the 3rd Generation Partnership Project (3GPP).

In the case where a node performing a function of the control plane and a node performing a function of the user plane are separated in a gateway, downlink traffic for a user equipment (UE) in an idle mode is generated and needs to be processed using a method different from the conventional methods. In other words, there is a need for a method for efficiently processing traffic as a node (the user plane node of the gateway) where traffic arrives differs from a node (the control plane node of the gateway) that should process paging.

In the 5G mobile communication system, downlink traffic generated for a UE in the idle mode may be frequently generated traffic or large-capacity traffic, and therefore it is an important task to efficiently process the traffic, reduce latency in data transmission to a user, and effectively use network resources.

SUMMARY

It is an object of the embodiments of the present disclosure to provide a method for transmitting a downlink packet for a UE in an idle mode which is capable of reducing a data transmission latency for a user and efficiently using network resources in a mobile communication system in which the control plane and the user plane of a gateway node are separated.

In accordance with some embodiments of the present disclosure, a method for transmitting a downlink packet to a user equipment (UE) in an idle mode in a mobile communication system in which a gateway is separated into a user plane node and a control plane node, the method comprising informing, by the control plane node, information for receiving the downlink packet for the UE to the user plane node, receiving and buffering, by the user plane node, the downlink packet for the UE, transmitting, by the user plane node, a notification message of a reception of the downlink packet to the control plane node, and transmitting, by the user plane node, the buffered downlink packet to the UE through a base station.

In accordance with some embodiments of the present disclosure, a gateway for transmitting a downlink packet to a user equipment (UE) in an idle mode in a mobile communication system, the gateway comprising a control plane node, and a user plane node, wherein the control plane node informs information for receiving the downlink packet for the UE to the user plane node, and wherein the user plane node receives and buffers the downlink packet for the UE, transmits a notification message of a reception of the downlink packet to the control plane node, and transmits the buffered downlink packet to the UE through a base station.

As is apparent from the above, according to embodiments of the present disclosure, in transmitting downlink data to a UE in an idle mode in a mobile communication system in which the control plane and the user plane of a gateway node are separated from each other, data transmission latency for a user may be reduced and network resources may be efficiently used.

According to an embodiment of the present disclosure, in the mobile communication system in which the user plane and the control plane of the gateway node are separated, the idle mode of the UE may be supported, thereby increasing the battery usage time.

According to an embodiment of the present disclosure, as the user plane nodes of the gateway are divided into a user plane node for processing traffic generated in a connected mode of a UE and a user plane node for buffering the downlink traffic generated in an idle mode of the UE, the service quality experienced by the user may be enhanced or the complexity of the user plane nodes of the gateway may be reduced.

According to an embodiment of the present disclosure, a user plane node to process traffic generated in the connected mode of a UE and a user plane node to buffer downlink traffic generated in the idle mode of the UE are configured by service chaining. Thereby, overhead caused by update of a routing path may be reduced.

DETAILED DESCRIPTION

Hereinafter, some embodiments of the present disclosure will be described in detail with reference to the accompanying exemplary drawings.

The following detailed description, together with the accompanying drawings, is intended to illustrate exemplary embodiments of the present disclosure and is not intended to represent the only embodiments through which the disclosure can be practiced.

Figure 1:
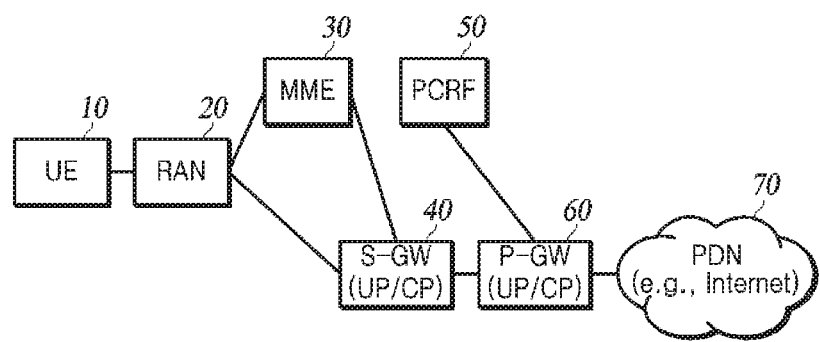
FIG. 1 is a configuration diagram of a conventional LTE mobile communication system.

FIG. 1 is a configuration diagram of a conventional LTE mobile communication system.

Referring to FIG. 1, a conventional LTE mobile communication system includes a user equipment (UE) 10, a base station (RAN) 20, a mobility management entity (MME) 30 (hereinafter referred to as "MME"), a serving gateway (S-GW) 40 (hereinafter referred to as "S-GW"), a packet data network gateway (P-GW) 60 (hereinafter referred to as "P-GW"), a policy and charging rule function (PCRF) 50 (hereinafter referred to as "PCRF"), and a packet data network (PDN) 70 (hereinafter referred to as "PDN").

The conventional LTE mobile communication system may be broadly divided into the UE 10, the RAN 20, and a core network. Here, the core network includes the MME 30, the S-GW 40, the P-GW 60, and the PCRF 50.

The gateways (S-GW and P-GW) included in the core network function to operatively connect the PDN 70 to the RAN 20. The functions of the gateways may be broadly divided into a function of a user plane (UP) to transmit a user data packet and a function of a control plane (CP) to control the function of the UP.

The main function of the CP is to finally determine a traffic transmission parameter to be used in the UP in consideration of user services, such as session management, mobility management, and QoS (Quality of Service) management, and the network state. The main function of the UP is to process (e.g., transmit, discard, or buffer) an actual user traffic packet by applying the parameter determined by the CP.

Most of the conventional gateway nodes (S-GW and P-GW) have both the function of the UP and the function of the CP.

However, for the mobile communication system according to an embodiment of the present disclosure, the CP and the UP of the gateway are separately located. Since the function performed by the UP is to process the user traffic packet according to the determined parameter as described above, it is simple and repetitive compared to the function performed by the CP. Therefore, according to this embodiment, the UP may be implemented with a switch which has low complexity and is inexpensive, and the CP may be centralized. Thereby, the overall performance of the mobile communication system may be improved. That is, by implementing the system by separating the functions of the UP and the CP according to the performance required by each of the functions of the UP and the CP, overall system performance may be improved. In addition, price efficiency of the system may be enhanced along with improvement in the performance of the system.

Hereinafter, a structure of a mobile communication system according to an embodiment of the present disclosure will be described in detail with reference to FIG. 2.

Figure 2:
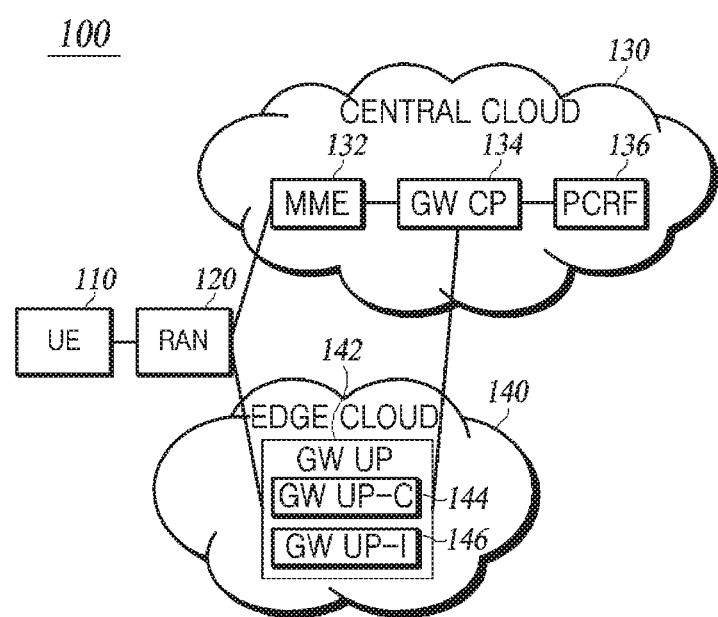
FIG. 2 is a configuration diagram of a mobile communication system according to an embodiment of the present disclosure.

FIG. 2 is a configuration diagram of a mobile communication system according to an embodiment of the present disclosure.

The mobile communication system 100 according to an embodiment of the present disclosure includes a UE 110, a RAN 120, an MME 132, gateway nodes 134 and 142, and a PCRF 136. Here, the gateway nodes 134 and 142 are separated into a CP node 134 (hereinafter referred to as "GW CP") and a UP node 142 (hereinafter referred to as "GW UP").

Hereinafter, the "node" in the description of the embodiments of the present disclosure may be implemented by a physical network apparatus, a software module performing a network function, or a combination thereof. The software module may be stored in a memory so as to perform one or more functions according to embodiments of the disclosure, which will be described below, and executed by one or more processors. The functions according to the embodiments of the present disclosure may be performed by one processor or may be performed by a plurality of processors in a distributed manner. The memory may be arranged inside or outside the processor and may be connected to the processor by various means known to those of ordinary skill in the art.

The memory may be a computer-readable recording/storage medium such as a random access memory (RAM), a read only memory (ROM), a flash memory, an optical disc, a magnetic disk, or a solid state drive (SSD). The processor may be implemented by a general purpose processor, a digital signal processor (DSP), an application specific integrated circuit (ASIC), a field programmable gate array (FPGA) or other programmable logic devices, an individual gate or transistor logic, individual hardware components, or any combination thereof.

The UE 110 may access an external network (not shown) via the RAN 120, a central cloud 130, and an edge cloud 140. The UE 110 is an electronic device having a communication function, and examples thereof may include various kinds of electronic devices such as a tablet, a laptop, a personal computer (PC), a portable multimedia player (PMP) a wireless communication terminal, a smartphone, a mobile communication terminal, a television, a digital video disc (DVD) player, an audio player, a refrigerator, an air conditioner, a gaming console, a set-top box, a medical device, and a measurement device.

The RAN 120 refers to a radio access network (RAN) node, which is an apparatus that constitutes an access network for call processing of the UE 110. The RAN 120 may be, for example, an e-NodeB.

The MME 132 is a node that performs signaling and control functions for supporting network access, network resource allocation, tracking, paging, roaming, and handover of the UE 110.

The GW CP 134 refers to a node that performs the CP function of the gateway, and the GW UP 142 refers to a node that performs the UP function of the gateway. The GW UP 142 may include a first UP node 144 (hereinafter referred to as "GW UP-C") and a second UP node 146 (hereinafter referred to as "GW UP-I") according to an embodiment of the present disclosure. The GW UP-C 144 and the GW UP-I 146 are nodes that are assigned the functions of the GW UP 142 according to the idle mode and the connected mode of the UE 110, and a detailed description thereof will be given later with reference to other drawings.

The PCRF 136 is a node that defines rules for policy and charging for each UE 110.

The MME 132, the GW CP 134 and the PCRF 136 may be virtualized and executed in the central cloud 130, and the GW UP 142 may be virtualized and executed in the edge cloud 140. The central cloud 130 and the edge cloud 140 may be implemented using a commercial server. Here, the edge cloud 140 is a cloud that is located at the edge of an operator network, i.e., near the UE or the base station to provide communication and computing functions.

According to an embodiment of the present disclosure, the functions of the gateway may be separated to move the GW UP forward and arrange the same in the edge cloud 140. As the physical path of the UE 110 and the RAN 120 is shortened due to the forward placement of the GW UP, the transmission latency of the user data may be effectively shortened.

However, due to the system structure in which the UP and the CP are separated from each other, it is difficult to process downlink traffic of the UE 110 in the idle mode. Specifically, this is because downlink traffic arrives at a UP node, but it is performed at the CP node that detects the arrival and triggers the paging and service request procedure (i.e., transmits a Downlink Data Notification message to the MME).

Another issue arises from the fact that processing the downlink packet of the UE 110 in the idle mode requires the packet storage (buffering) function to be included in the UP node. Specifically, if the buffering function is implemented in all UP nodes, a packet that should be quickly transmitted to a UE in the connected mode may not be processed due to execution of the buffering function, which may result in service quality degradation. Further, it may become difficult to implement a UP node with switches which have low complexity as described above.

To address these issues, embodiments of the present disclosure provide a method for processing downlink traffic for the UE 110 in the idle mode by exchanging information between the UP node and the CP node.

Hereinafter, embodiments of the present disclosure will be described in detail with reference to FIGS. 3 to 5B.

Figure 3:
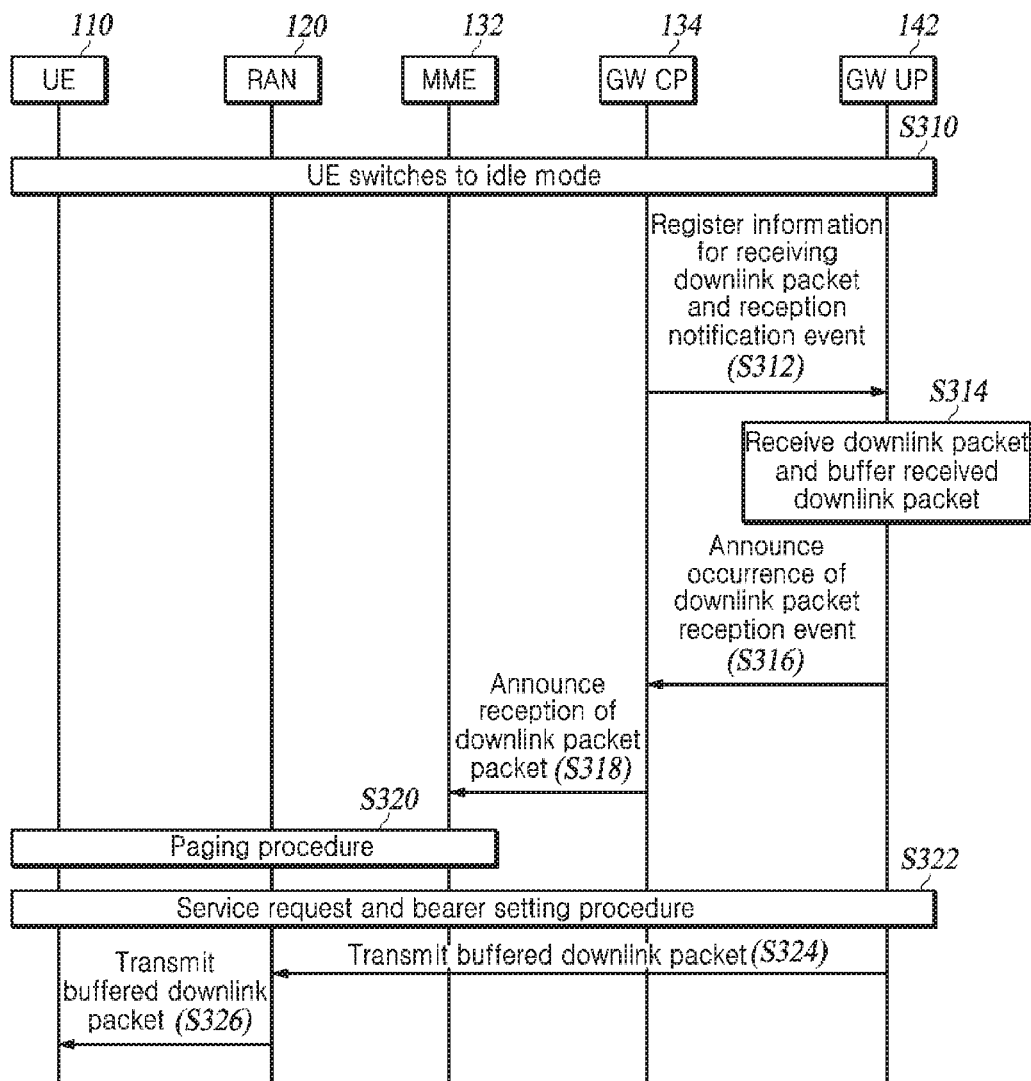
FIG. 3 is a flowchart illustrating a downlink data transmission method for a UE in an idle mode according to an embodiment of the present disclosure.

FIG. 3 is a flowchart illustrating a downlink data transmission method for a UE in an idle mode according to an embodiment of the present disclosure.

Referring to FIG. 3, the UE 110 switches to the idle mode after terminating data transmission in the connected mode (S310). Then, the GW CP 134 indicates information for receiving a downlink packet for the UE 110 and a reception notification to the GW UP 142 (S312). Step S312 may include the step of transmitting, by the GW CP 134, information including at least one of the International Mobile Subscriber Identification (IMSI) and IP address of the UE 110 to the GW UP.

In an embodiment, when the GW UP 142 and the GW CP 134 communicate using the OpenFlow protocol, the information that the GW CP 134 transmits to the GW UP 142 may further include filter information for specifying a specific IP address. In this case, the GW UP 134 may transmit, to the GW CP 134, a message including at least one of reception information about a downlink packet matching the filter, a UE to which the received downlink packet belongs, an IP address, and a tunnel endpoint identifier (TEID).

According to an embodiment of the present disclosure, the GW UP-C 144 may transmit a first forwarding table update command message including a preset buffering time to the GW UP. Here, the preset buffering time may be set based on, for example, the subscription information about the user or service characteristics. In this case, even if the GW UP receives the downlink packet, it does not transmit a downlink packet reception notification message to the GW CP 134 until the preset buffering time elapses. This may reduce battery consumption of the UE 110 which uses a service that is not sensitive to latency.

After step S312, when the IMSI of the UE 110 or a downlink packet destined for the IP address is received by the GW UP 142, the GW UP 142 buffers the received downlink packet (S314) and transmits a downlink packet reception notification message to the GW CP 134 (S316). The notification message of the downlink packet reception may include at least one of the IMSI of the UE, an IP address, and a tunnel endpoint identifier (TEID).

The GW CP 134 transmits, to the mobility management entity (MME), a reception notification message of the downlink packet for notifying that the downlink packet for the UE 110 in the idle mode has been received (S318). Here, the reception notification message of the downlink packet may include the TEID of the EPS bearer to which the packet belongs.

If the GW CP 134 does not receive the TEID from the GW UP 142, the reception notification message of the downlink packet may include the TEID of a default bearer of a packet data network connection (PDN connection) identified by at least one of the IMSI and IP address of the UE 110. The GW CP 134 transmits, to the MME 132, a message for notifying that the downlink packet has been received, using the notification information received from the GW UP 142.

After step S318, the MME 132 transmits a paging request message to the UE 110 and receives a service request message from the UE 110, over the RAN 120. Thereby, a paging procedure S320 and a bearer setting procedure S322 for the UE 110 in the idle mode are performed.

The GW UP 134 transmits the buffered downlink packet to the UE 110 via the RAN 120 (S324 and S326). Specifically, the GW UP 134 transmits the buffered downlink packet to the RAN 120 using the bearer set in step S322, and the RAN 120 transmits the received downlink packet to the UE 110 (S326).

While it is illustrated in FIG. 3 that the respective operations are sequentially executed, embodiments are not limited thereto. In other words, the operations disclosed in FIG. 3 may be executed in a different order or one or more of the operations may be executed in parallel. Thus, the operations of FIG. 3 are not limited to a time-series order.

According to the embodiment illustrated in FIG. 3, the downlink traffic for the UE 110 in the idle mode may be processed in the mobile communication network 100 in which the GW CP 134 and the GW UP 142 are separated from each other.

When the UE 110 is switched to the idle mode, the GW UP 142 according to an embodiment of the present disclosure may process downlink traffic by performing the buffering function. However, the buffering function may increase complexity of the mobile communication system. This is because the amount of traffic to be buffered by the GW UP 142 may be large or switching to the idle mode may frequently occur, as the UE connected to the network stays in the idle mode for most of the time. For this reason, in order to buffer a large amount of traffic, the GW UP 142 should be equipped with a large capacity buffer, which may increase the complexity of the UP node. If the number of the UEs is large or the UEs frequently enter the idle mode, traffic processing for a UE in the connected mode may be delayed due to traffic processing for the UEs in the idle mode. Therefore, it is necessary to separate the functions of the GW UP 142 according to the connected mode or the idle mode of the UE 110 to reduce complexity of the node or to prevent the idle mode traffic processing from affecting the connected mode traffic processing.

Hereinafter, embodiments of the present disclosure for addressing the above-mentioned issues will be described with reference to FIG. 4A and FIG. 4B.

Figure 4A:
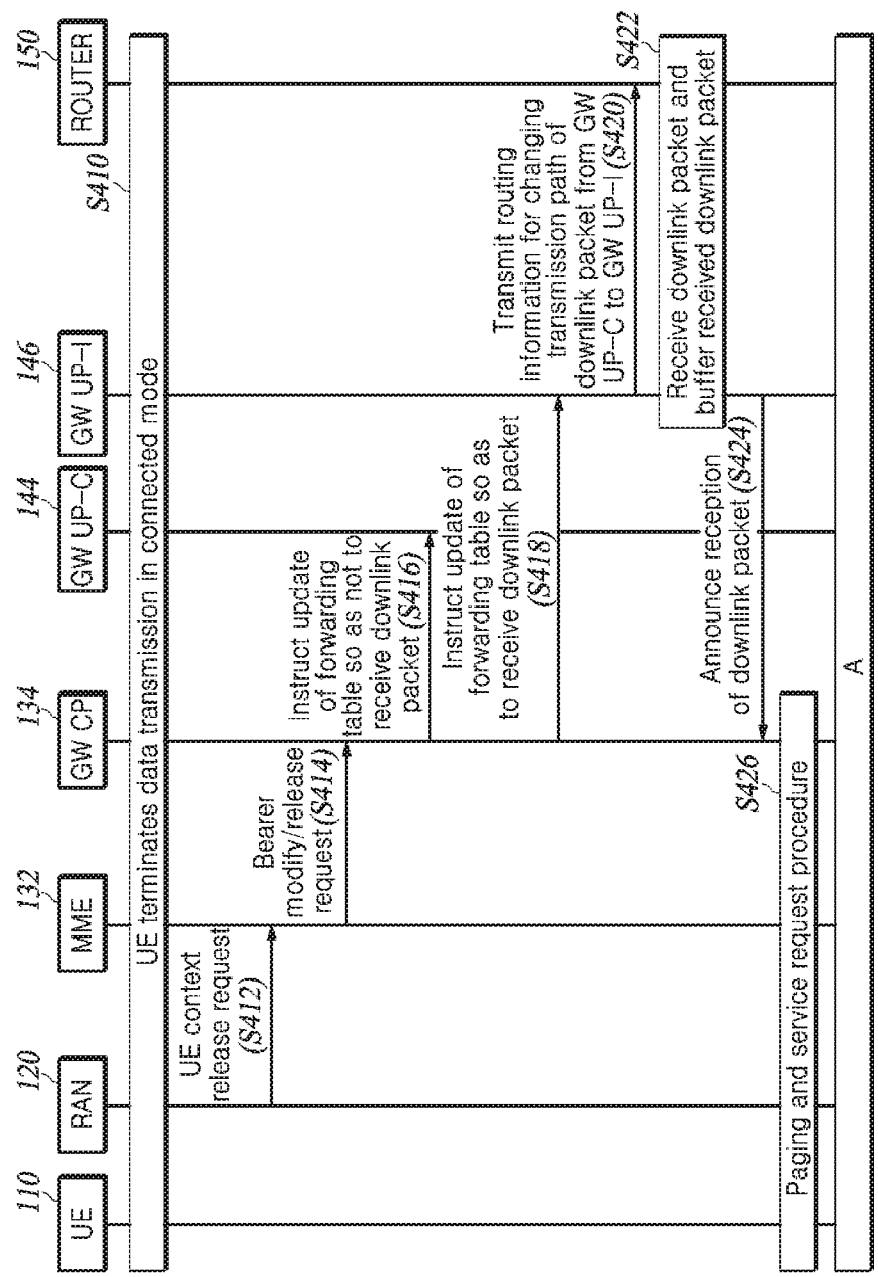
FIG. 4A and FIG. 4B are flowcharts illustrating a downlink data transmission method for a UE in an idle mode according to another embodiment of the present disclosure.
Figure 4B:
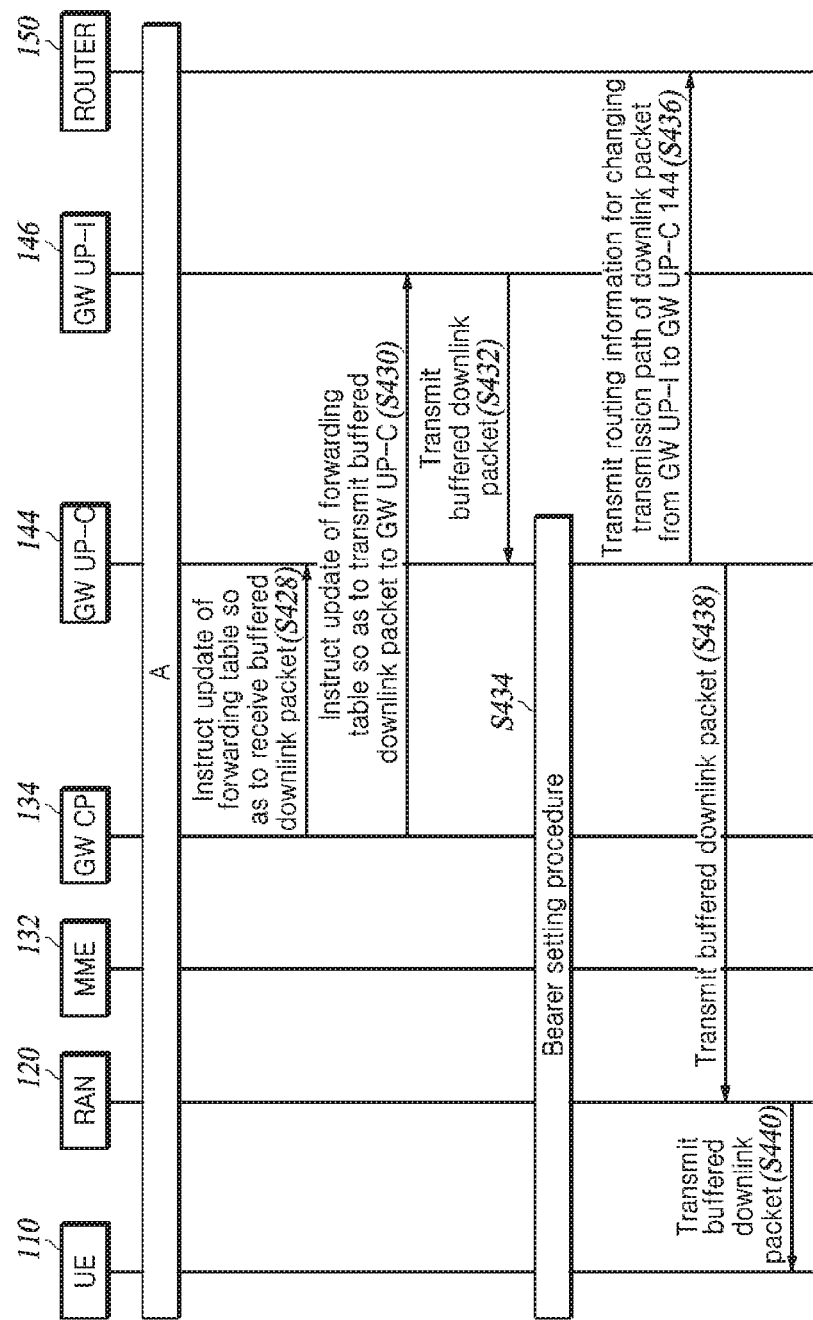

FIG. 4A and FIG. 4B are flowcharts illustrating a downlink data transmission method for a UE in an idle mode according to another embodiment of the present disclosure.

Referring to FIG. 4A and FIG. 4B, the mobile communication system 100 of this embodiment may include a GW UP-C for processing traffic generated in the connected mode of the UE 110, and a GW UP-I for buffering traffic generated in the idle mode of the UE 110.

In this embodiment, the GW UP 142 is separated into a GW UP-C 144 and a GW UP-I 146 and the buffering function in the idle mode is concentrated at the GW UP-I 146. Thereby, complexity of the GW UP-C 144 may be reduced and an influence on connected mode traffic processing may be reduced.

Referring to FIG. 4A, the UE 110 first terminates data transmission in the connected mode (S410). Then, the RAN 120 may transmit a UE context release request message (e.g., UE Context Release Request) to the MME 132 (S412), and the MME 132 may transmit a bearer modify/release request message (e.g., Bearer Release Request) to the GW CP 134 (S414). Steps S412 and S414 are merely exemplary as a procedure of switching the UE 110 to the idle mode, and those skilled in the art will appreciate that various modifications and variations can be made without departing from the essential features of this embodiment.

The GW CP 134 transmits a first forwarding table update command message to the GW UP-I 146 and the GW UP-C 144 as the UE 110 is switched to the idle mode (S416). Here, the first forwarding table update command message may refer to a message for instructing update of the forwarding table such that the GW UP-I 146, not the GW UP-C 144, receives the downlink packet generated for the UE 110 in the idle mode.

Specifically, the GW CP 134 may transmit, to GW UP-C 144, a message instructing the GW UP-C 144 to update the forwarding table so as not to receive the downlink packet for the UE 110 in the idle mode (S416). In addition, the GW CP 134 may transmit, to the GW UP-I 146, a message instructing the GW UP-I 146 to update the forwarding table to receive the downlink packet for the UE 110 in the idle mode (S418).

According to an embodiment of the present disclosure, the GW UP-C 144 may transmit, to the GW UP-I 146, the first forwarding table update command message including a preset buffering time. Here, the preset buffering time may be set based on, for example, the subscription information about the user or the service characteristics. In this case, even if the GW UP-I 146 receives the downlink packet, it does not transmit a downlink packet reception notification message to the GW CP 134 until the preset buffering time elapses. This may reduce battery consumption of the UE 110 which uses a service that is not sensitive to latency.

Upon receiving the first forwarding table update command message, the GW UP-I 146 changes the transmission path of the downlink packet from the GW UP-C 144 to the GW UP-I 146 (S420). Specifically, the GW UP-I 146 may transmit, to one or more routers 150, routing information for changing the routing path as described above.

Once the GW UP-I 146 receives the downlink packet for the UE 110 in the idle mode along the changed routing path, the GW UP-I 146 transmits a downlink packet reception notification message indicating the reception to the GW CP 134 (S424). Here, the reception notification message of the downlink packet may include IMSI of the UE 110, an IP address, and a tunnel endpoint identifier (TEID). As described above, when the GW UP-I 146 receives the buffering time, it may delay transmission of the reception notification message of the downlink packet until the buffering time elapses.

Step S426 is similar to the paging procedure and the service request procedure described above with reference to FIG. 3, and thus a description thereof will be omitted.

The GW CP 134 transmits a second forwarding table update command message to the GW UP-C 144 and the GW UP-I 146 in response to the reception notification message of the downlink packet (S428 and S430). Specifically, the GW CP 134 may transmit a message instructing update of the forwarding table to allow the GW UP-C 144 to receive the downlink packet buffered in the GW UP-I 146 (S428). In addition, the GW CP 134 may transmit a message instructing update of the forwarding table such that the downlink packet buffered in the GW UP-I 146 is forwarded to the GW UP-C 144 (S430). Here, the message instructing update of the forwarding table may include the address or port information about the GW UP-C 144.

The GW UP-I 146 transmits the buffered downlink packet to the GW UP-C 144 using the path generated according to update of the forwarding table (S432).

An operation of resetting the bearer (e.g., the EPS bearer) may be performed in order to transmit the downlink packet from the GW UP-C 144 to the RAN 120 (S434).

The GW UP-C 144 may transmit routing information for changing the routing path to one or more routers 150 in order to change, from the GW UP-I 146 to the GW UP-C 144, the transmission path of the downlink packet generated after the UE 110 is switched from the idle mode to the connected mode (S436).

The GW UP-C 144 transmits the downlink packet buffered in the GW UP-I 146 to the UE 110 via the RAN 120 (S438 and S440). Specifically, the GW UP-C 144 transmits the downlink packet to the RAN 120 using the bearer set in step S434, and the RAN 120 transmits the received downlink packet to the UE 110 (S440).

While it is illustrated In FIGS. 4A and 4B that the respective operations are sequentially executed, embodiments are not limited thereto. In other words, the operations disclosed in FIGS. 4A and 4B may be executed in a different order or one or more of the operations may be executed in parallel. Thus, the operations of FIGS. 4A and 4B are not limited to the time-series order.

While it is illustrated in the previous embodiment that, when the UE 110 in the idle mode is switched to the connected mode, a packet buffered in the GW UP-I 146 is transmitted to the GW UP-C 144, and then the GW UP-C 144 transmits the packet to the UE 110 via the RAN 120, embodiments are not limited thereto. For example, in the case where the GW UP-I 146 is directly connected to the RAN 120, the GW CP 134 may cause the packets buffered in the GW UP-I 146 to be transmitted to the RAN 120, and then may set and transmit forwarding information to the GW UP-I 146 and the GW UP-C 144 such that the downlink packet transmission path is changed to the GW UP-C 144.

In the embodiment illustrated in FIGS. 4A and 4B, the first UP node (GW UP-C) for processing traffic generated in the connected mode of the UE 110 is separated from the second UP node (GW UP-I) for buffering traffic generated in the idle mode. Thereby, efficiency of the system may be improved.

However, as the downlink packet transmission path is changed between the GW UP-C 144 and the GW UP-I 146, there is an overhead of transmission of routing path information to one or more routers 150. Therefore, a method for reducing such overhead is required.

Hereinafter, an embodiment of the present disclosure for addressing the aforementioned issue will be described with reference to FIG. 5A and FIG. 5B.

Figure 5A:
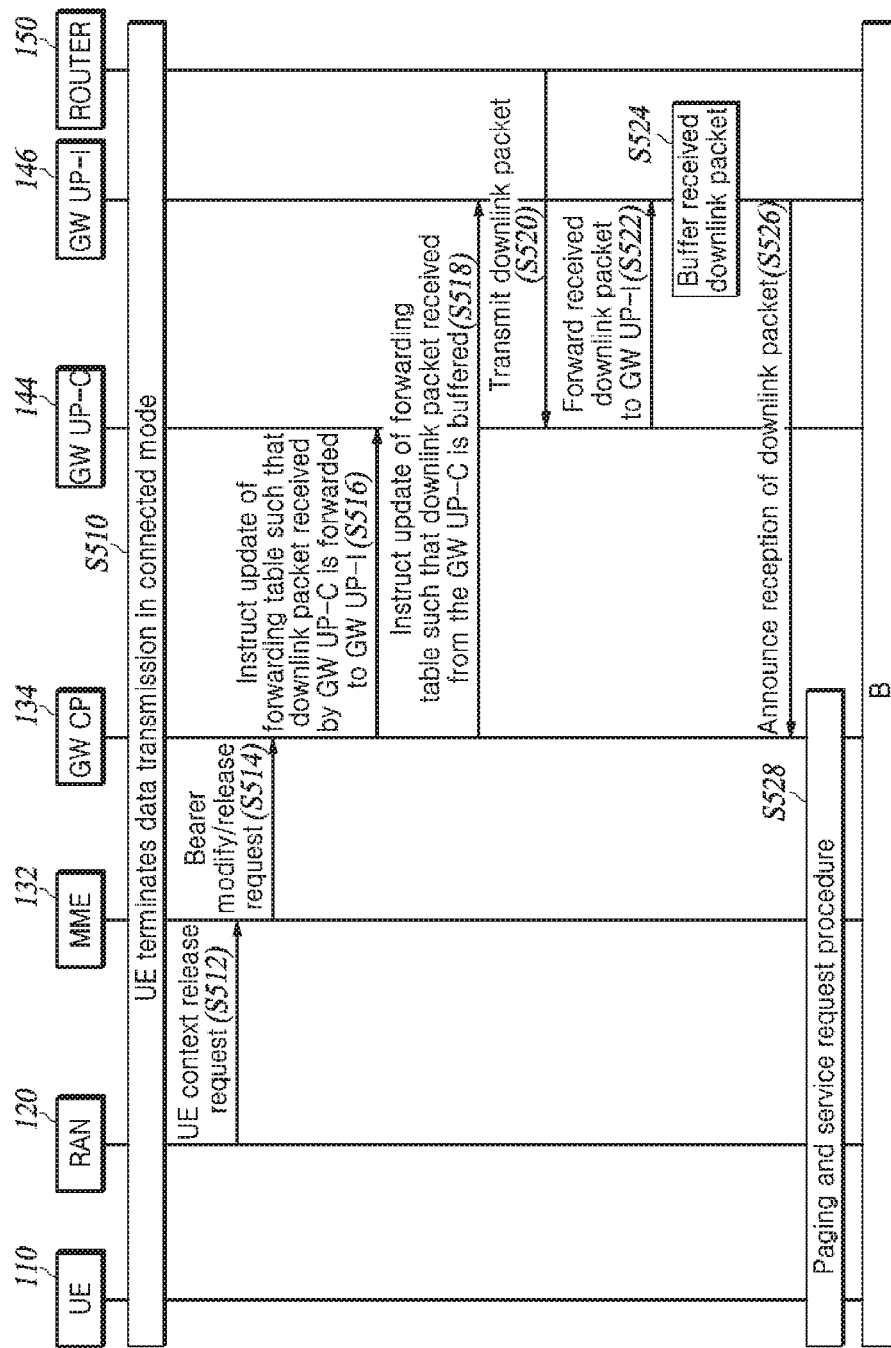
FIG. 5A and FIG. 5B are flowcharts illustrating a downlink data transmission method for a UE in an idle mode according to yet another embodiment of the present disclosure.
Figure 5B:
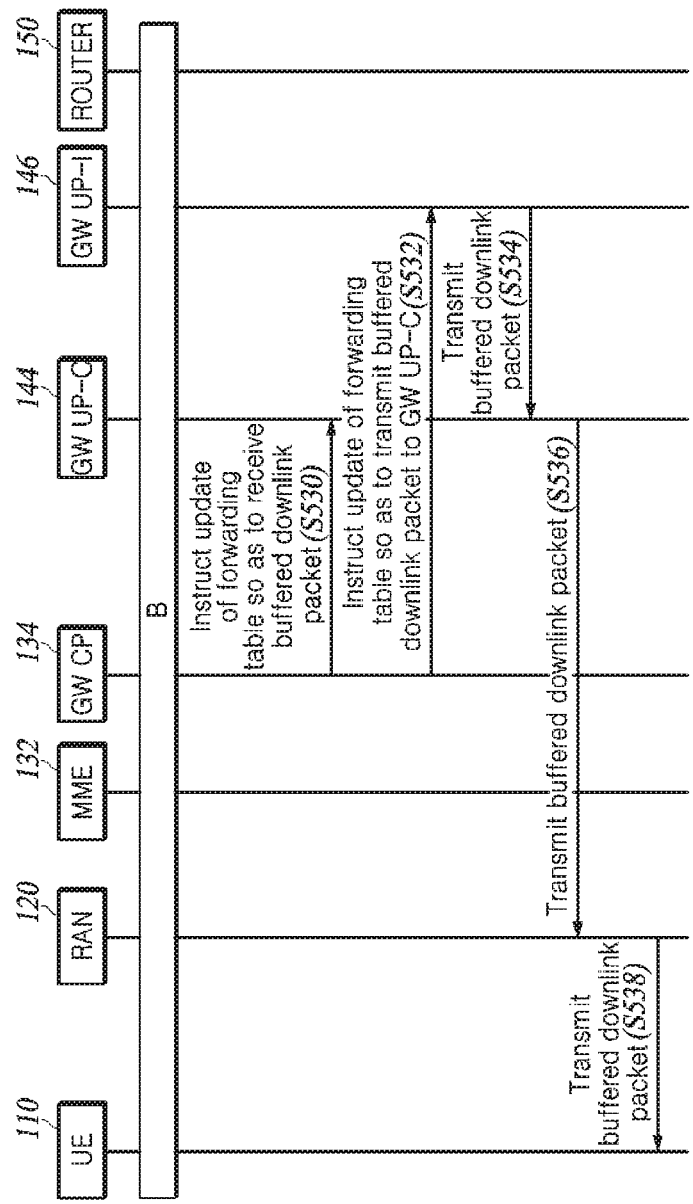

FIG. 5A and FIG. 5B is flowcharts illustrating a downlink data transmission method for a UE in an idle mode terminal according to yet another embodiment of the present disclosure.

Referring to FIG. 5A, the UE 110 first terminates data transmission in the connected mode (S510). Then, the RAN 120 may transmit a UE context release request message (e.g., UE Context Release Request) to the MME 132 (S512), and the MME 132 may transmit a bearer modify/release request message (e.g., Bearer Release Request) to the GW CP 134 (S514). Steps S412 and S414 are merely examples of a procedure of switching the UE 110 to the idle mode, and those skilled in the art will appreciate that various modifications and variations can be made without departing from the essential features of this embodiment.

In this embodiment, the GW UP-C 144 and the GW UP-I 146 are connected by service chaining. The functions of the GW UP-C 144 and the GW UP-I 146 may be virtualized and connected. Application of service chaining means that the downlink packet transmission is performed along a path running from the GW UP-C 144 to the GW UP-I 146 to the GW UP-C 144 and to the RAN 120. On this path, the GW UP-I 146 receives and stores the idle mode traffic from the GW UP-C and transfers the same back to the GW UP-C when the UE 110 is switched to the connected mode.

As the UE 110 is switched to the idle mode, the GW CP 134 transmits a first forwarding table update command message to the GW UP-I 146 and the GW UP-C 144. Here, the first forwarding table update command message may be a message instructing update of the forwarding table such that the GW UP-C 144 receives a downlink packet generated in the idle mode of the UE 110 and forwards the same to the GW UP-I 146, and the GW UP-I 146 buffers the forwarded downlink packet.

That is, the GW CP 134 may transmit, to the GW UP-C 144, a message instructing update of the forwarding table such that the downlink packet received by the GW UP-C 144 is forwarded to the GW UP-I 146 (S516). In addition, the GW CP 134 may transmit, to the GW UP-I 146, a message instructing update of the forwarding table such that the downlink packet received from the GW UP-C 144 is buffered (S518).

According to an embodiment of the present disclosure, the GW UP-C 144 may transmit a first forwarding table update command message including a preset buffering time to the GW UP-I 146. Here, the preset buffering time may be set based on, for example, the subscription information about the user or the service characteristics. In this case, even if the GW UP-I 146 receives a downlink packet, it does not transmit a downlink packet reception notification message to the GW CP 134 until the preset buffering time elapses. This may reduce battery consumption of the UE 110 which uses a service that is not sensitive to latency.

The downlink packet generated for the UE 110 in the idle mode is first transmitted to the GW UP-C 144 (S520). The GW UP-C 144 forwards the received downlink packet to the GW UP-I 146 by an established service chain (S522).

The GW UP-I 146 buffers the received downlink packet (S522), and transmits, to the GW CP 134, a downlink reception notification message for announcing that the downlink packet has been received (S526). If the buffering time described above is set, the GW UP-I 146 may buffer the packet until the buffering times elapses and may transmit the reception notification message to the GW CP 134 at the time when the buffering expires.

Step S528 is similar to the paging procedure and the service request procedure described above with reference to FIG. 3, and a description thereof will thus be omitted.

Thereafter, the GW CP 134 transmits a second forwarding table update command message to the GW UP-C 144 and the GW UP-I 146 in response to the reception notification message of the downlink packet (S530, S532) and causes the downlink packet buffered in the GW UP-I 146 to be transmitted to the GW UP-C 144 (S534).

Specifically, the GW CP 134 may transmit a message instructing update of the forwarding table to allow the GW UP-C 144 to receive the downlink packet buffered in the GW UP-I 146 (S530). In addition, the GW CP 134 may transmit a message instructing update of the forwarding table such that a downlink packet generated after the UE 110 is switched to the connected mode is not forwarded to the GW UP-I 146. This is intended to disable the service chain established when the UE 110 is in the idle mode.

In addition, the GW CP 134 may transmit, to the GW UP-I 146, a message instructing update of the forwarding table such that the downlink packet buffered in the GW UP-I 146 is forwarded to the GW UP-C 144 (S532). Here, the command message (the second forwarding table update command message) transmitted by the GW CP 134 may include the address or port information about the GW UP-C 144.

The GW UP-I 146 may forward the buffered downlink packet to the

GW UP-C 144 (S534), and the GW UP-C 144 may transmit the buffered downlink packet received from the GW UP-I 146 to the UE 110 via the RAN 120 (S536 and S538). Details are similar to those described above with reference to FIG. 4B, and a description thereof will be omitted.

While it is illustrated in the previous embodiment that, when the UE 110 in the idle mode is switched to the connected mode, a packet buffered in the GW UP-I 146 is transmitted to the GW UP-C 144, and then the GW UP-C 144 transmits the packet to the UE 110 via the RAN 120, embodiments are not limited thereto. For example, in the case where the GW UP-I 146 is directly connected to the RAN 120, the GW CP 134 may cause the packets buffered in the GW UP-I 146 to be transmitted to the RAN 120, and then may set and transmit forwarding information to the GW UP-I 146 and the GW UP-C 144 such that the downlink packet transmission path is changed to the GW UP-C 144.

Steps are described to be sequentially performed in FIG. 5A and FIG. 5B as a mere example for describing the technical idea of some embodiments, although one of ordinary skill in the pertinent art would appreciate that various modifications, additions and substitutions are possible by performing the sequences shown in FIG. 5A and FIG. 5B in a different order or at least one of steps in parallel without departing from the idea and scope of the embodiments, and hence the examples shown in FIG. 5A and FIG. 5B are not limited to the chronological order.

The steps shown in FIG. 3 to FIG. 5B can be implemented as a computer program, and can be recorded on a non-transitory computer-readable medium. The computer-readable recording medium includes any type of recording device on which data that can be read by a computer system are recordable. Examples of the computer-readable recording medium include a magnetic storage medium (e.g., a floppy disk, a hard disk, a ROM, USB memory, etc.), an optically readable medium (e.g., a CD-ROM, DVD, Blue-ray, etc.) and carrier waves (e.g., transmission through the Internet). Further, an example computer-readable recording medium has computer-readable codes that can be stored and executed in a distributed mode in computer systems connected via a network.

Although exemplary embodiments of the present disclosure have been described for illustrative purposes, those skilled in the art will appreciate that various modifications, additions and substitutions are possible, without departing from the idea and scope of the claimed invention. Exemplary embodiments of the present disclosure have been described for the sake of brevity and clarity. Accordingly, one of ordinary skill would understand the scope of the disclosure is not limited by the explicitly described above embodiments but is inclusive of the claims and equivalents thereof.

As described above, the present disclosure is applicable to a technology for transmitting downlink data to a UE in an idle mode. Thereby, the present disclosure may reduce transmission latency, improve the efficiency of use of network resources by separating the CP and the UP of gateway nodes and increase the battery usage time by supporting the idle mode of the UE.

What is claimed is:

1. A method for transmitting a downlink packet to a user equipment (UE) in an idle mode in a mobile communication system in which a gateway is separated into a user plane node and a control plane node, the method comprising:
receiving, by the user plane node, an update command message including a preset buffering time from the control plane node;
receiving and buffering, by the user plane node, the downlink packet for the UE;
transmitting, by the user plane node, a notification message of a reception of the downlink packet to the control plane node;
transmitting, by the user plane node, the buffered downlink packet to the UE through a base station; and
delaying, by the user plane node, the notification message of the reception of the downlink packet to the control plane node based on buffering timers,
wherein the user plane node is separated into a first user plane node and a second user plane node, and
wherein the update command message is a message instructing update of a forwarding table to receive the downlink packet generated in the idle mode of the UE by the second user plan node, not by the first user plane node.

2. The method according to claim 1, wherein the control plane node informs information for receiving the downlink packet for the UE to the user plane node.

3. The method according to claim 1, wherein the user plane node delays the notification message of the reception of the downlink packet to the control plane node until the preset buffering time elapses.

4. The method according to claim 3, wherein the preset buffering time is set based on the subscription information about a user or service characteristics.

5. The method according to claim 2, wherein the information includes at least one of an International Mobile Subscriber Identification (IMSI), an IP address of the UE and a tunnel endpoint identifier (TEID).

6. The method according to claim 1, further comprising: transmitting, by the control plane node, the notification message of a reception of the downlink packet to a mobility management entity (MME).

7. A gateway for transmitting a downlink packet to a user equipment (UE) in an idle mode in a mobile communication system, the gateway comprising:
a control plane node; and
a user plane node,
wherein the user plane node receives an update command message including a preset buffering time from the control plane node, receives and buffers the downlink packet for the UE, transmits a notification message of a reception of the downlink packet to the control plane node, and transmits the buffered downlink packet to the UE through a base station,
wherein the user plane node delays the notification message of the reception of the downlink packet to the control plane node based on buffering timers,
wherein the user plane node is separated into a first user plane node and a second user plane node, and
wherein the update command message is a message instructing update of a forwarding table to receive the downlink packet generated in the idle mode of the UE by the second user plan node, not by the first user plane node.

8. The gateway according to claim 7, wherein the control plane node informs information for receiving the downlink packet for the UE to the user plane node.

9. The gateway according to claim 7, wherein the user plane node delays the notification message of the reception of the downlink packet to the control plane node until the preset buffering time elapses.

10. The gateway according to claim 9, wherein the preset buffering time is set based on the subscription information about a user or service characteristics.

11. The gateway according to claim 8, wherein the information includes at least one of an International Mobile Subscriber Identification (IMSI), an IP address of the UE and a tunnel endpoint identifier (TEID).

12. The gateway according to claim 7, wherein the control plane node transmits the notification message of a reception of the downlink packet to a mobility management entity (MME).

* * * * *